US011388588B2

(12) United States Patent
Chandramouli et al.

(10) Patent No.: US 11,388,588 B2
(45) Date of Patent: Jul. 12, 2022

(54) OPTIMIZED SMALL DATA TRANSMISSION OVER UPLINK

(71) Applicant: NOKIA SOLUTIONS AND NETWORKS OY, Espoo (FI)

(72) Inventors: Devaki Chandramouli, Plano, TX (US); Rainer Liebhart, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 79 days.

(21) Appl. No.: 16/301,256

(22) PCT Filed: May 13, 2016

(86) PCT No.: PCT/US2016/032290
§ 371 (c)(1),
(2) Date: Nov. 13, 2018

(87) PCT Pub. No.: WO2017/196360
PCT Pub. Date: Nov. 16, 2017

(65) Prior Publication Data
US 2019/0215302 A1 Jul. 11, 2019

(51) Int. Cl.
*G06F 9/00* (2006.01)
*G06F 15/16* (2006.01)
(Continued)

(52) U.S. Cl.
CPC ....... *H04W 12/033* (2021.01); *H04L 12/4633* (2013.01); *H04L 12/66* (2013.01);
(Continued)

(58) Field of Classification Search
CPC ... H04W 12/0013; H04W 76/12; H04W 4/70; H04W 12/0401; H04W 12/0017;
(Continued)

(56) References Cited

U.S. PATENT DOCUMENTS

2010/0030839 A1* 2/2010 Ceragioli ................ H04L 63/20
709/201
2011/0216743 A1* 9/2011 Bachmann .......... H04W 12/088
370/331
(Continued)

FOREIGN PATENT DOCUMENTS

EP     2194686 A1    6/2010
EP     2555562 A1    2/2013
(Continued)

OTHER PUBLICATIONS

"3rd Generation Partnership Project; Technical Specification Group Services and System Aspects; Study on security aspects of Machine-Type Communications (MTC) and other mobile data applications communications enhancements (Release 12)", Jun. 26, 2014.
(Continued)

*Primary Examiner* — Darshan I Dhruv
(74) *Attorney, Agent, or Firm* — Squire Patton Boggs (US) LLP

(57) ABSTRACT

Various communication systems may benefit from an improved signaling protocol. For example, machine-to-machine communications in a network may benefit from improved signaling and security. A method includes establishing a secure data transmission path for an application. The secure data transmission path is used to transmit data between a user equipment and a network element. The network entity includes a gateway or an application server. The method also includes transmitting data for the application over the secure data transmission path using a pre-configured radio bearer. The radio bearer is pre-configured for data transmission between the user equipment and an access node located between the user equipment and the network element. In addition, the method includes receiving
(Continued)

a response message at the user equipment from the network element through the secure data transmission path.

22 Claims, 10 Drawing Sheets

(51) Int. Cl.
| | |
|---|---|
| *G06F 17/00* | (2019.01) |
| *H04L 29/06* | (2006.01) |
| *H04L 12/46* | (2006.01) |
| *H04L 12/66* | (2006.01) |
| *H04W 4/70* | (2018.01) |
| *H04W 12/08* | (2021.01) |
| *H04W 12/033* | (2021.01) |
| *H04W 12/02* | (2009.01) |
| *H04W 76/12* | (2018.01) |
| *H04W 12/037* | (2021.01) |
| *H04W 12/041* | (2021.01) |
| *H04W 12/088* | (2021.01) |
| *H04L 9/40* | (2022.01) |

(52) U.S. Cl.
CPC ............. *H04L 63/029* (2013.01); *H04W 4/70* (2018.02); *H04W 12/02* (2013.01); *H04W 12/037* (2021.01); *H04W 12/041* (2021.01); *H04W 12/088* (2021.01); *H04W 76/12* (2018.02)

(58) Field of Classification Search
CPC ......... H04W 12/0808; H04W 12/4633; H04W 12/02; H04W 12/033; H04W 12/041; H04W 12/088; H04L 12/66; H04L 63/029
See application file for complete search history.

(56) References Cited

U.S. PATENT DOCUMENTS

| | | | | |
|---|---|---|---|---|
| 2011/0261787 A1* | 10/2011 | Bachmann | .......... | H04W 12/037 |
| | | | | 370/331 |
| 2012/0213165 A1* | 8/2012 | Miklos | ................ | H04W 12/062 |
| | | | | 370/329 |
| 2013/0080597 A1* | 3/2013 | Liao | ...................... | H04L 5/0001 |
| | | | | 709/219 |
| 2013/0085880 A1* | 4/2013 | Roth | ....................... | H04L 63/08 |
| | | | | 705/26.1 |
| 2013/0201924 A1* | 8/2013 | Song | ..................... | H04W 76/10 |
| | | | | 370/329 |
| 2014/0126489 A1* | 5/2014 | Zakrzewski | .......... | H04W 28/26 |
| | | | | 370/329 |
| 2014/0165155 A1* | 6/2014 | Zhang | .................. | H04W 12/04 |
| | | | | 726/4 |
| 2014/0219182 A1* | 8/2014 | Chandramouli | ...... | H04W 68/02 |
| | | | | 370/328 |
| 2014/0254490 A1* | 9/2014 | Jain | ....................... | H04W 76/19 |
| | | | | 370/328 |
| 2015/0180653 A1 | 6/2015 | Nix | | |
| 2015/0281966 A1* | 10/2015 | Griot | ..................... | H04W 12/35 |
| | | | | 726/5 |
| 2015/0373523 A1* | 12/2015 | Jeong | .................. | H04L 41/5029 |
| | | | | 455/406 |
| 2016/0088515 A1* | 3/2016 | Griot | ..................... | H04L 63/205 |
| | | | | 370/230 |
| 2016/0127968 A1* | 5/2016 | Velev | ..................... | H04W 4/50 |
| | | | | 370/331 |
| 2018/0109941 A1* | 4/2018 | Jain | ......................... | H04W 8/14 |
| 2018/0152984 A1* | 5/2018 | Palanisamy | ........... | H04W 76/15 |
| 2019/0116031 A1* | 4/2019 | Truchan | ............ | H04W 36/0038 |

FOREIGN PATENT DOCUMENTS

| | | | |
|---|---|---|---|
| GB | 2489221 A | | 9/2012 |
| WO | WO 2015/018074 A1 | | 2/2015 |
| WO | WO 2016/073984 | * | 5/2016 |
| WO | WO 2016/073984 A2 | * | 5/2016 |
| WO | WO 2016/073984 A2 | | 5/2016 |

OTHER PUBLICATIONS

"3rd Generation Partnership Project; Technical Specification Group Services and System Aspects; Study on security aspects of Machine-Type Communications (MTC) and other mobile data applications communications enhancements (Release 12)", Dec. 23, 2013.
Nokia Corporation et al: "Comments on Threats for small data fast path solution in SA2 TR 23.887", 3GPP Draft; S3-130189 Comments By Nokia-NSN On S3-130149_Small Data_Threat_PCR_33868_FIN-130116, 3rd Generation Partnership Project (3GPP), Mobile Competence Centre; Jan. 16, 2013.
Nov. 15, 2019 Extended Search Report issued in European Patent Application No. 16901872.8.
International Search Report & Written Opinion dated Aug. 19, 2016 corresponding to International Patent Application No. PCT/US2016/032290.
3GPP TS 23.682 V13.5.0 (Mar. 2016), Technical Specification, 3rd Generation Partnership Project; Technical Specification Group Services and System Aspects; Architecture enhancements to facilitate communications with packet data networks and applications (Release 13), Mar. 2016.
3GPP TS 23.401 V13.6.1 (Mar. 2016), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 13), Mar. 2016.
Communication pursuant to Article 94(3) EPC dated Apr. 15, 2021 corresponding to European Patent Application No. 16901872.8.
Ericsson et al., "Security solution for small data fast path in SA2 TR 23.887," 3GPP, S3-130152, 3GPP TSG SA WG3 (Security) Meeting #70, Sophia Antipolis, France, Jan. 21-25, 2013.
Communication pursuant to Article 94(3) EPC dated May 25, 2022 corresponding to European Patent Application No. 16901872.8.

* cited by examiner

OPTIMIZED SMALL DATA TRANSMISSION OVER UPLINK

BACKGROUND

Field

Various communication systems may benefit from an improved signaling protocol. For example, machine-to-machine communications in a network may benefit from improved signaling and security.

Description of the Related Art

Evolved Packet System (EPS) is the successor of General Packet Radio System (GPRS). Some of the benefits of EPS include providing for a new radio interface and new packet core network functions for broadband wireless data access. FIG. 1 illustrates an evolved packet core architecture 110 according to 3GPP TS 23.401. As shown in FIG. 1, EPS core network functions can include a Mobility Management Entity (MME), a Packet Data Network Gateway (PDN-GW), a Serving Gateway (S-GW), and a Home Subscriber Server (HSS). 3GPP TS 23.401 titled "GPRS enhancements for Evolved Universal Terrestrial Radio Access (E-UTRAN)" is hereby incorporated in its entirety.

EPS may be supported by various 3rd Generation Partnership Project (3GPP) technology, such as Long Term Evolution (LTE), LTE-Advanced (LTE-A), or other Evolved Universal Terrestrial Radio Access networks. EPS may also be supported by radio access network of global system for mobile communication (GSM)/GPRS (GERAN), and Universal Terrestrial Radio Access (UTRAN). A common packet domain, such as a core network, may be used for Radio Access Networks (RAN), GERAN, and UTRAN. This common core network provides GPRS services.

$5^{th}$ generation (5G) telecommunications is a new generation of radio systems and network architecture that can deliver extreme broadband and ultra-robust, low latency connectivity. 5G allows for massive machine-to-machine connectivity for the Internet of Things (IoT). 5G can also improve the telecommunication services offered to the end users, and help support massive machine-to-machine (M2M) communications. For example, industrial control, vehicular safety, transport system efficiency, and eHealth applications may all be improved by the implementation of 5G.

5G provides support for Machine-Type-Communication (MTC). MTC is a form of data communication that involves one or more entities that do not necessarily need human interaction. MTC can be characterized as having a large number of communication terminals, with each terminal having little traffic. FIG. 2 illustrates a 3GPP architecture for MTC 210 as described in 3GPP TS 23.682. 3GPP TS 23.682 titled "Architecture enhancements to facilitate communications with packet data networks and applications" is hereby incorporated in its entirety.

To allow for MTC, 3GPP has introduced an MTC Interworking Function (MTC-IWF) 220. New interfaces were then introduced in order to connect the MTC-IWF to the existing core network. For example, S6m, Tsp, Tsms, T5a, T5b, T5c, and T4 were introduced. 3GPP has introduced the MTC-IWF and the interfaces in order to allow the triggering of devices with or without Mobile Station International Subscriber Directory Number (MSISDN) from an internal or an external MTC server.

M2M devices and applications, however, have a large number of varying use cases. For example, in some use cases the M2M devices use short message service (SMS) messages. However, not all M2M devices are capable of sending or receiving SMS. Due to this wide variation amongst M2M devices and applications, a set of features that will meet the needs of different applications running in M2M devices for a whole spectrum of use cases has not been developed.

SUMMARY

A method in certain embodiments, may include establishing a secure data transmission path for an application. The secure data transmission path is used to transmit data between a user equipment and a network element. The network entity may include a gateway or an application server. The method may also include transmitting data for the application over the secure data transmission path using a pre-configured radio bearer. The radio bearer is pre-configured for data transmission between the user equipment and an access node located between the user equipment and the network element. In addition, the method may include receiving a response message at the user equipment from the network element through the secure data transmission path.

According to certain embodiments, an apparatus may include at least one memory including computer program code, and at least one processor. The at least one memory and the computer program code may be configured, with the at least one processor, to cause the apparatus at least to establish a secure data transmission path for an application. The secure data transmission path is used to transmit data between a user equipment and a network element. The network element may include a gateway or an application server. The at least one memory and the computer program code may also be configured, with the at least one processor, at least to transmit data for the application over the secure data transmission path using a pre-configured radio bearer. The radio bearer is pre-configured for data transmission between the user equipment and an access node located between the user equipment and the network element. In addition, the at least one memory and the computer program code may also be configured, with the at least one processor, at least to receive a response message at the user equipment from the network element through the secure data transmission path.

An apparatus, in certain embodiments, may include means for establishing a secure data transmission path for an application. The secure data transmission path is used to transmit data between a user equipment and a network element.

The network element may include a gateway or an application server. The apparatus may also include means for transmitting data for the application over the secure data transmission path using a pre-configured radio bearer. The radio bearer is pre-configured for data transmission between the user equipment and an access node located between the user equipment and the network element. In addition, the apparatus may include means for receiving a response message at the user equipment from the network element through the secure data transmission path.

According to certain embodiments, a non-transitory computer-readable medium encoding instructions that, when executed in hardware, perform a process. The process may include establishing a secure data transmission path for an application. The secure data transmission path is used to transmit data between a user equipment and a network element. The network element may include a gateway or an application server. The process may also include transmitting data for the application over the secure data transmission path using a pre-configured radio bearer. The radio bearer is pre-configured for data transmission between the user equipment and an access node located between the user equipment and the network element. In addition, the process may include receiving a response message at the user equipment from the network element through the secure data transmission path.

According to certain embodiments, a computer program product encoding instructions for performing a process according to a method including establishing a secure data transmission path for an application. The secure data transmission path is used to transmit data between a user equipment and a network element. The network element may include a gateway or an application server. The method may also include transmitting data for the application over the secure data transmission path using a pre-configured radio bearer. The radio bearer is pre-configured for data transmission between the user equipment and an access node located between the user equipment and the network element. In addition, the method includes receiving a response message at the user equipment from the network element through the secure data transmission path.

A method, in certain embodiments, may include establishing a secure data transmission path for an application. The secure data transmission path is used to transmit data between a network element and a user equipment. The network element may include a gateway or an application server. The method can also receiving data for the application through the secure data transmission path using a pre-configured radio bearer. The radio bearer is pre-configured for data transmission between the user equipment and an access node located between the network element and the user equipment. In addition, the method can include transmitting the data from the network element to a destination server.

According to certain embodiments, an apparatus may include at least one memory including computer program code, and at least one processor. The at least one memory and the computer program code may be configured, with the at least one processor, to cause the apparatus at least to establish a secure data transmission path for an application. The secure data transmission path is used to transmit data between a network element and a user equipment. The network element may include a gateway or an application server. The at least one memory and the computer program code may also be configured, with the at least one processor, to cause the apparatus at least to receive data for the application through the secure data transmission path using a pre-configured radio bearer. The radio bearer is pre-configured for data transmission between the user equipment and an access node located between the network element and the user equipment. In addition, the at least one memory and the computer program code may be configured, with the at least one processor, to cause the apparatus at least to transmit the data from the network element to a destination server.

An apparatus, in certain embodiments, may include means for establishing a secure data transmission path for an application. The secure data transmission path is used to transmit data between a network element and a user equipment.

The network element may include a gateway or an application server. The apparatus may also include means for receiving data for the application through the secure data transmission path using a pre-configured radio bearer. The radio bearer is pre-configured for data transmission between the user equipment and an access node located between the network element and the user equipment. In addition, the apparatus may include means for transmitting the data from the network element to a destination server.

According to certain embodiments, a non-transitory computer-readable medium encoding instructions that, when executed in hardware, perform a process. The process may include establishing a secure data transmission path for an application. The secure data transmission path is used to transmit data between a network element and a user equipment. The network element may include a gateway or an application server. The process may also include receiving data for the application through the secure data transmission path using a pre-configured radio bearer. The radio bearer is pre-configured for data transmission between the user equipment and an access node located between the network element and the user equipment. In addition, the process may include transmitting the data from the network element to a destination server.

According to certain embodiments, a computer program product encoding instructions for performing a process according to a method including establishing a secure data transmission path for an application. The secure data transmission path is used to transmit data between a network element and a user equipment. The network element may include a gateway or an application server. The method may also include receiving data for the application through the secure data transmission path using a pre-configured radio bearer. The radio bearer is pre-configured for data transmission between the user equipment and an access node located between the network element and the user equipment. In addition, the method may include transmitting the data from the network element to a destination server.

BRIEF DESCRIPTION OF THE DRAWINGS

For proper understanding of the invention, reference should be made to the accompanying drawings, wherein.

DETAILED DESCRIPTION

Figure 1:
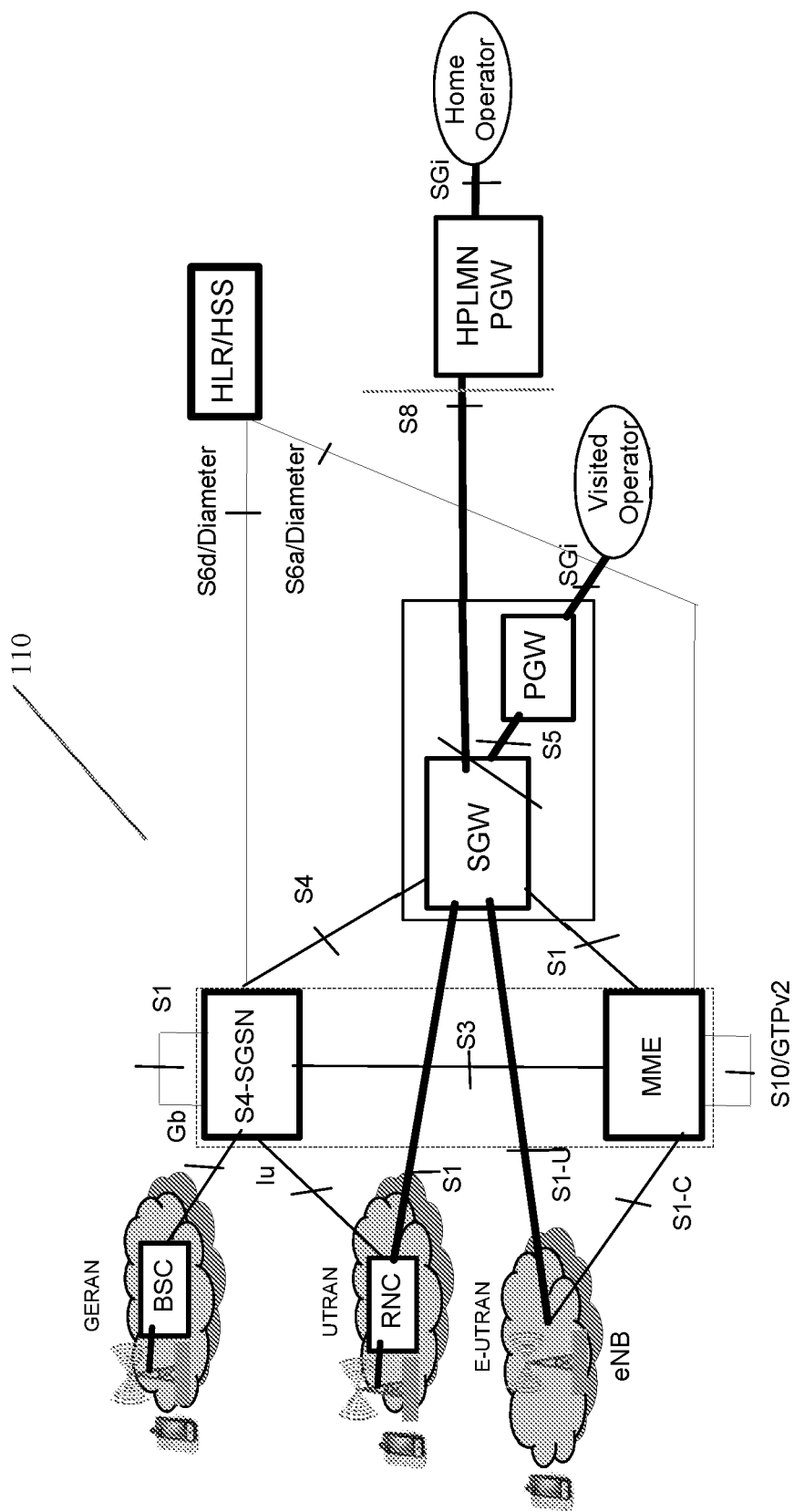
FIG. 1 illustrates an Evolved Packet Core architecture.
Figure 2:
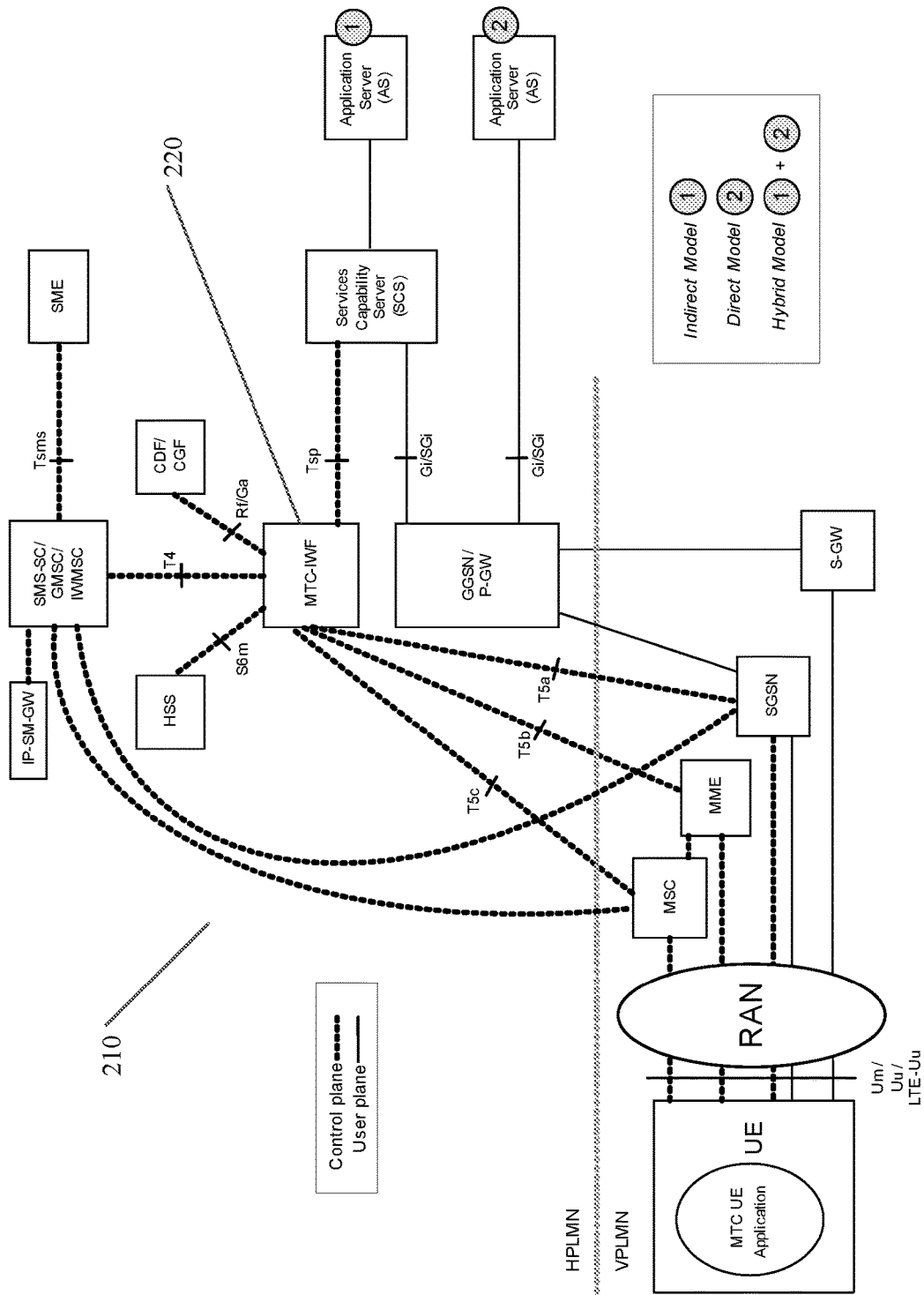
FIG. 2 illustrates a 3GPP architecture for Machine-Type Communication.

Certain embodiments can provide for a method, apparatus, computer program, or other embodiments for improving MTC in any network provided by 3GPP or any other standard setting organization. Some embodiments can transmit data over the user plane without excessive signaling caused by idle-connected mode transitions and bearer establishment procedures. Other embodiments may ensure that transmitted data can be transmitted in any frequency, and that the data remains secure without compromising the reachability of the user equipment.

Certain embodiments aim to provide a secure data transmission path, for example, a secure data connection path in a user plane for small data transmissions. The user equipment can transmit data without having to perform excessive signaling, while also providing security for the user plane and the end to end connectivity in applications, for example, M2M applications.

In some embodiments, data may be, for example, small data transmissions. Some M2M applications send and/or receive a small amount of data. The exact amount of data that is considered to be small may differ depending on the nature of the MTC. Small data transmissions may happen anytime, as needed by the M2M application. The volume of small data transmitted may have an upper limit. The upper limit, in certain embodiments, may be constrained by the radio design and/or the mobility of the user equipment.

Before the transmission of small data, the MTC device may be attached or detached from the network. An MTC device, for example, may be a user equipment (UE) equipped for MTC or for supporting a M2M application, which communicates through a public land mobile network (PLMN) with MTC servers and/or another MTC device. Examples of MTC applications include electric power, gas, or water metering, industrial and home automation applications, and any other type of sensor-based application.

The M2M application may be under the control of the mobile network operator (MNO). The MNO may determine security credentials and/or monitor traffic patterns. In certain embodiments, a secure data transmission path may be established between the UE, which can be an MTC device, and a network element, in the network, for example, a gateway or an application server. The gateway may be a user plane gateway (uGW) node in a 5G network, or a serving gateway (SGW) in an LTE network.

The secure data transmission path between the UE and the network element, for example, a gateway or an application server, may include several secured tunnels or connections. The secure data transmission path may also have the ability to provide data security, for example, confidentiality, integrity protection, and authentication at the IP level between the UE and the network element. In certain embodiments, the secure data transmission path may include a secure connection or secure tunnel, similar to a Virtual Private Network (VPN) tunnel, between the UE and network element. The secure connection may be valid for a certain duration, while in other embodiments the secure connection may not have a temporal limit. The duration for which a secure connection will be valid may be determined by the MNO. Another example of the secure data transmission path may include a security token that can be exchanged between the UE and the network element for confidentiality protection. The token may also, in certain embodiments, be valid for a certain duration of time.

Figure 3A:
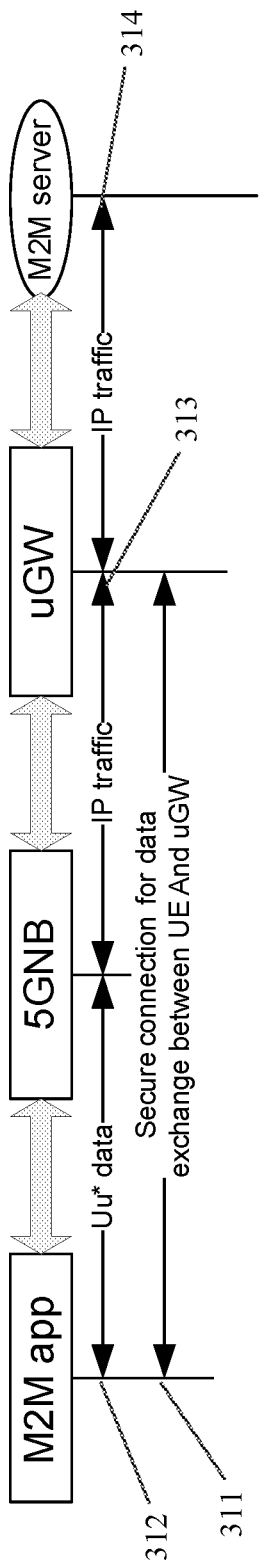
FIG. 3A illustrates a signal flow diagram according to certain embodiments.

FIG. 3A illustrates a signal flow diagram according to certain embodiments. In particular, FIG. 3A illustrates establishing a secure data transmission path for a machine-to-machine application between a user equipment and a network element, such as a gateway. In certain embodiments, a secure connection is established between the UE, in which the application, for example, an M2M application, is located, and a gateway, as shown in step 311 of FIG. 3A. The gateway can be located in the user plane. Setup of the secure connection, shown in step 311, can be triggered through various ways, including by the M2M application itself on the UE. In other embodiments, setup of the secure connection may be triggered by the network. The network may decide to set up the secure connection based on, for example, subscription data or upon sensing a need for a machine type service.

To establish the secure connection, the UE and the gateway may in certain embodiments use at least one credential. The at least one credential to establish the secure connection can be derived from a component within the UE, such as a Universal Integrated Circuit Card (UICC). Credentials can also be sent to the UE from any other network entity. On the gateway end, credentials to establish the secure connection can be received from a control plane node, such as a control plane network function, for example, a Mobile Gateway (cMGW) in a 5G network or a MME in a LTE network. In other embodiments, the gateway may receive credentials from the Home Subscriber Server (HSS) or the Authentication, Authorization, and Accounting (AAA) server.

In step 312, a radio bearer may be established or configured between the UE and the access node, such as a 5G Node B or an evolved Node B in LTE. The access node can be located between the user equipment and the user plane gateway. The radio bearer may be part of the secure data transmission path. In certain embodiments, the radio bearer may be pre-configured and used to transmit data for a machine-to-machine application. For example, when the UE initially registers with the network, the pre-configured radio bearer may be used to transmit data. When the UE transmits data for the M2M application over the secure data transmission path, the UE can use the pre-configured radio bearer. The UE may use the pre-configured radio bearer to transmit data toward the gateway, through the access node.

In certain embodiments the pre-configured radio bearer between the UE and the access node, shown in step 312, may run over the Uu interface in LTE or the 5G equivalent of the Uu interface. The data sent through the pre-configured radio bearer may in some embodiments be encrypted.

In step 313, the access node can transmit to the gateway the data received from UE through the pre-configured radio bearer. In some embodiments, the data transmitted from the access node to the gateway may be referred to as IP traffic. In step 314, the user plane gateway may transmit the received data of the IP traffic towards the destination server, for example, an M2M destination server. A destination server, for example, an M2M server, may be any server that is capable of communicating with the PLMN itself, and with the UE through the PLMN. Upon receiving the data of the IP traffic, the M2M server may then send the gateway a response message. The gateway can then forward or transmit the response message to the UE through the secure data transmission path. The address of the destination server or device, for example, an M2M device or an M2M server, may be included in the data sent by the UE, and received by the network element, such as a gateway.

In certain embodiments, the response message may be transmitted through the secure connection between the M2M application and the gateway. In other embodiments, the response message may be transmitted using the pre-configured radio bearers between the access node and the UE.

Figure 3B:
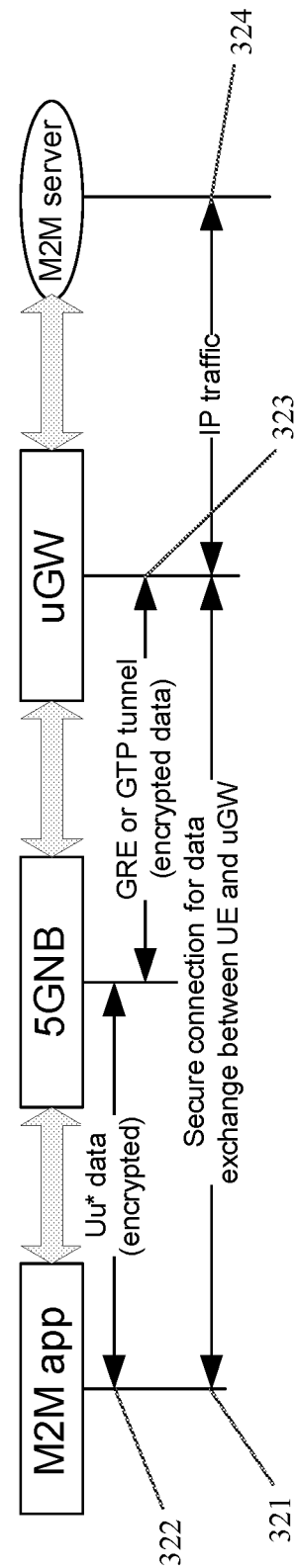
FIG. 3B illustrates a signal flow diagram according to certain embodiments.

FIG. 3B illustrates a signal flow diagram according to certain embodiments. In particular, FIG. 3B illustrates establishing a secure data transmission path for a machine-tomachine application between a user equipment and a gateway. Similar to FIG. 3A, the embodiment of FIG. 3B includes a secure connection between the user equipment the gateway that is established in step 321, and a pre-configured radio bearer between the UE and the access node that is established in step 322. The data sent through the pre-configured radio bearer may be encrypted.

In addition, in step 323 the embodiment of FIG. 3B illustrates that the secure data transmission path also includes a tunnel established between the access node and the gateway. The tunnel, for example, may be a generic routing encapsulation (GRE) tunnel or a general packet radio service tunneling protocol (GTP) tunnel. The data sent through the tunnel may be encrypted in some embodiments.

In certain embodiments, the tunnel may be set up for every single UE in the network, or the tunnel may be set up to accommodate a group of UEs. A group of UEs may be two or more UEs using the same M2M application, and being connected to the same access node. In other words, a single tunnel between the access node and the gateway may in some embodiments be used for all the UEs using the same M2M application that are connected to the access node. Criteria for the establishment of the tunnel shown in step 323 may be received from any entity in the network. A central control plane entity such as MME or the similar control plane network function in the 5G network architecture can provide information to the access node and gateway. The information may relate to when, how, and for which kind of application traffic to establish the tunnel between the access node and the gateway. Optionally, this kind of information can be pre-configured in the access node and the gateway. The secure data transmission path illustrated in FIGS. 3A and 3B may include a pre-configured radio bearer, a GRE or GTP tunnel, and a secure connection.

Figure 4A:
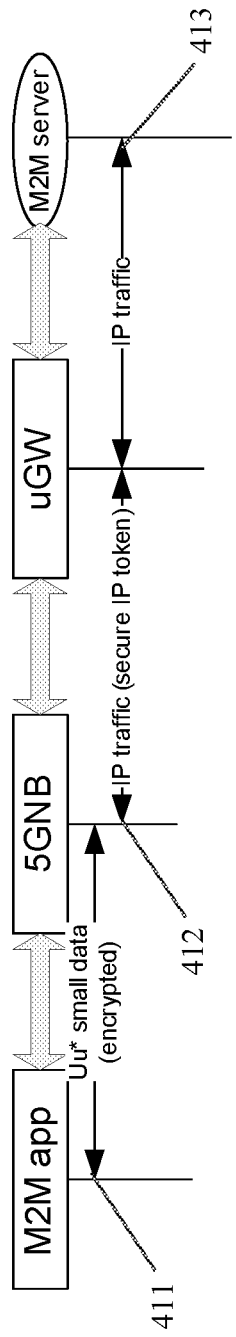
FIG. 4A illustrates a signal flow diagram according to certain embodiments.

FIG. 4A illustrates a signal flow diagram according to certain embodiments. In particular, FIG. 4A illustrates establishing a secure data transmission path for an application, such as a machine-to-machine application, between a user equipment and a network element, such as a gateway or an application server. In certain embodiments, data security may be provided at the IP packet level between the UE and the gateway. In one example, data security may be similar to Internet Protocol Security (IPsec), in which each IP packet of a communication session can be authenticated and encrypted. To help facilitate data security in the IP packet level, the secure data transmission path shown in FIG. 4A can include at least one security token that can be exchanged between UE and the access node.

In step 411, a radio bearer may be pre-configured between the UE, upon which the application operates, and the access node. The UE may transmit data to the access node when the UE initially registers with the network. When the application wants to transmit data, it uses the pre-configured radio bearer and transmit an IP packet. The IP packet may include a security token derived, for example, in the UE and network. In other embodiments, the IP packet may use IPsec mechanisms, for example, an IPsec security authentication header (AH) or IP Encapsulating Security Payload (ESP) modes.

In certain embodiments, the security token may be derived from a component within the UE, for example, a UICC. The token can be derived from a secure number or a secure string stored on the UICC using, for example, a hash algorithm. On the access node end, the security token may be provided from the control plane network function, or the access node may generate the token itself. In some embodiments, the security token may only be valid for a finite time period. In other embodiments, no limit is placed on the validity period of the security token.

In step 412, the access node may forward the data or the IP traffic received from the user equipment to the gateway. The data forwarded may include the security token. In step 413, the gateway transmits the received IP traffic towards the destination server, for example, an M2M server. The address of the destination M2M may be included in the data sent by the UE, and received by the gateway.

Figure 4B:
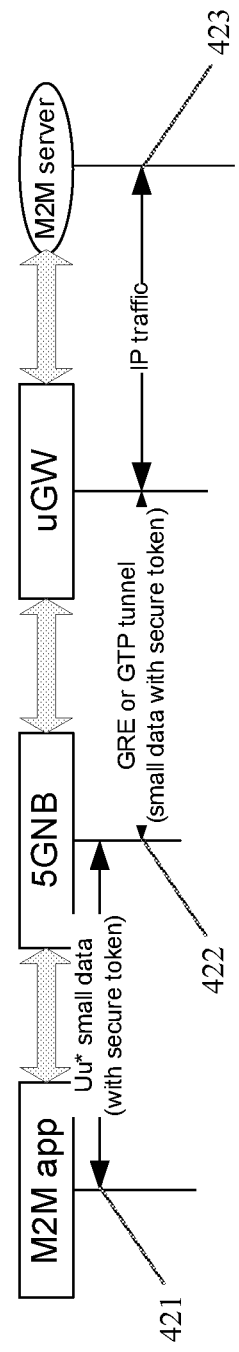
FIG. 4B illustrates a signal flow diagram according to certain embodiments.

FIG. 4B illustrates a signal flow diagram according to certain embodiments. In particular, FIG. 4B illustrates establishing a secure data transmission path for an application, for example, a machine-to-machine application, between a user equipment and a network element, for example a gateway or an application server Similar to FIG. 4A, the embodiment of FIG. 4B includes a pre-configured radio bearer between the UE and the access node, as shown in step 421. FIG. 4B can also include the security token, which may be transmitted from the UE to the access node or from the access node to the UE.

Similar to step 323 of FIG. 3B, the embodiment of FIG. 4B can include a tunnel established between the access node and the gateway, as shown in step 422. The tunnel, for example, may be a GRE tunnel or a GTP tunnel. The data sent through the tunnel may be encrypted in some embodiments. In certain embodiments, the tunnel may be per UE, for a group of UEs, or one per 5GNB (5G access node) and uGW combination, similar to the tunnel established in step 323. In step 423, the gateway may forward the received data of the IP traffic to the M2M server.

Figure 5:
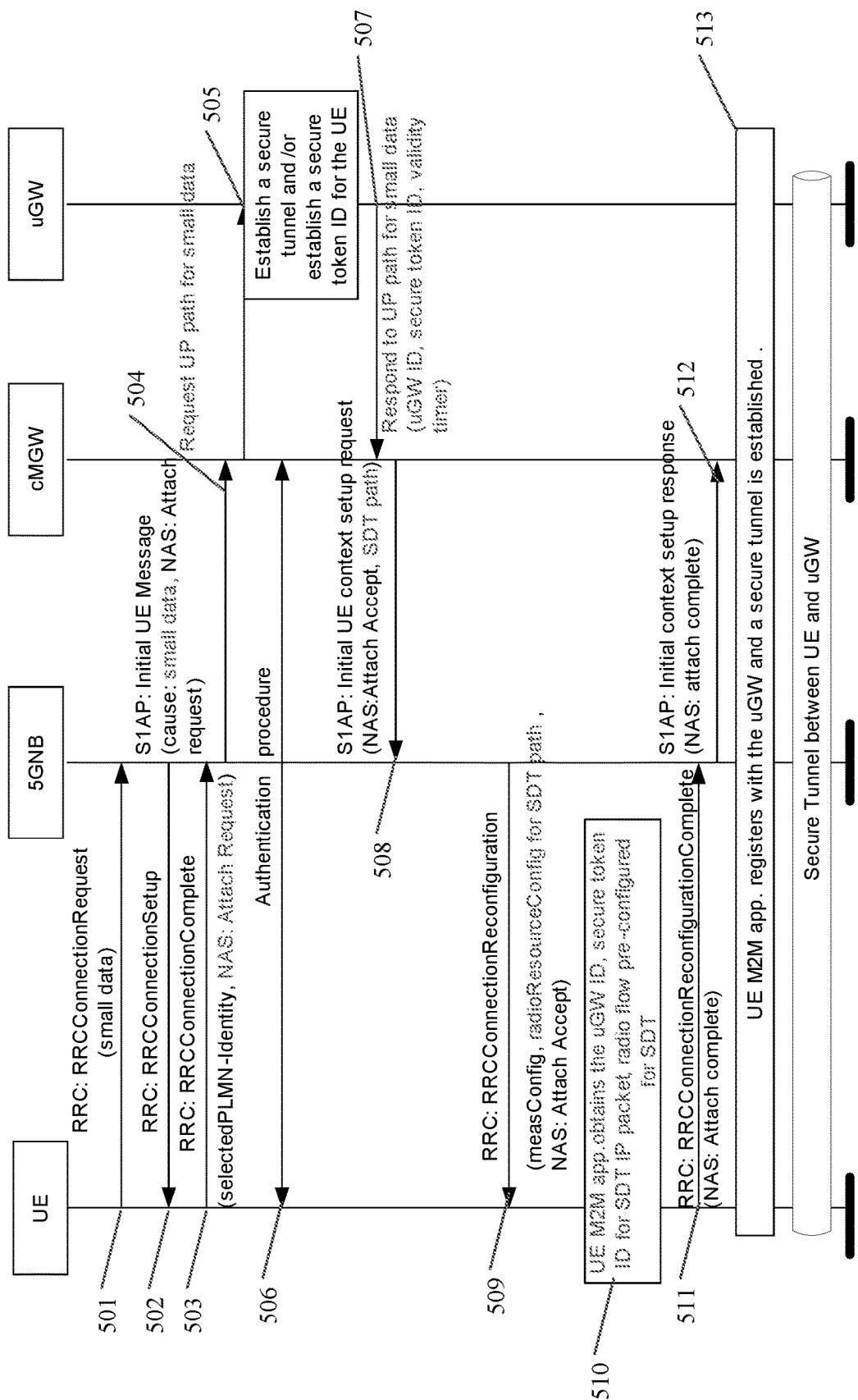
FIG. 5 illustrates a signal flow diagram according to certain embodiments.

FIG. 5 illustrates a signal flow diagram according to certain embodiments. In particular, FIG. 5 illustrates UE registration that allows for uplink data transmission for machine-to-machine application, and for the establishment of a secure tunnel between the UE and the gateway, as shown in steps 311 and 321 of FIGS. 3A and 3B. When the UE registers with the network, several steps may be used to establish the secure data transmission path for small data transmission. In step 501, the UE may send an access node, such as a 5GNB, an RRCConnectionRequest. The RRCConnectionRequest may include a request for small data transmission. In step 502, the access node may respond and transmit an RRCConnectionSetup to the UE.

The UE can respond with sending an RRCConnectionComplete to confirm the establishment of the RRC connection between the UE and the access node, in step 503. The RRCConnectionComplete message may include at least one of a selected PLMN-identity or a Non-Access Stratum (NAS) attach request. In step 504, the access node may use the S1 Application Protocol (S1AP), in an LTE network, or similar RAN-CN reference point protocol for 5G network, to forward an initial UE message to a control plane gateway node, for example, a control plane network function. The UE message may also include an RRC establishment cause, which the access node may forward to the control plane network function. The establishment cause can be used by the UE to indicate to the network a reason for establishing of the connection, for example, small data transmission. In some embodiments, the access node message may also include a NAS attach request received from the UE.

In certain embodiments, the control plane network function may request an uplink path for a small data transmission from a user plane gateway node, such as an uGW, in step 505. The uGW can in some embodiments help to facilitate the establishment of a secure data path transmission that may include a secure tunnel and/or a security token. In step 506 an authentication procedure may occur between the UE and the control plane network function. This authentication procedure may be used to grant access to the network for a UE by helping ensure that the credentials indicated by the UE are valid.

In step 507, the uGW can send a response message to the control plane network function. The response message may be in response to a request for uplink path transmission for small data. In certain embodiments, the uGW may include an uGW ID, for example, an IP address or a Fully Qualified Domain Name (FQDN). The uGW may in some embodiments also include the security token in the response message. In addition, the uGW may also include a validity timer which will dictate a period of time for which the security token will remain valid.

The control plane network function, in step 508, can send the access node an initial UE context setup request. The setup request can include NAS attach accept, and information about the small data path, including the uGW ID, the security token ID, and the validity timer. In step 509, the access node can send an RRCConnectionReconfiguration to the user equipment. The RRCConnectionReconfiguration may include a radio resource configuration for the secure data transmission path, as well as the NAS attach accept. Once the UE receives the RRCConnectionReconfiguration, the UE M2M application can obtain the uGW ID in step 510. The UE M2M application can also obtain a security token for small data transmission IP Packet, and/or a radio bearer or flow pre-configured for small data transmission.

In step 511, the UE can send an RCConnectionReconfigurationComplete message to the access node indicating that the pre-configured radio bearer is established. In step 512, the access node can send the control plane network function an initial context setup response indicating that the pre-configured radio bearer is established. The UE M2M application can then register with the uGW and a secure connection tunnel or a secure tunnel can be established, as shown in step 513.

Figure 6:
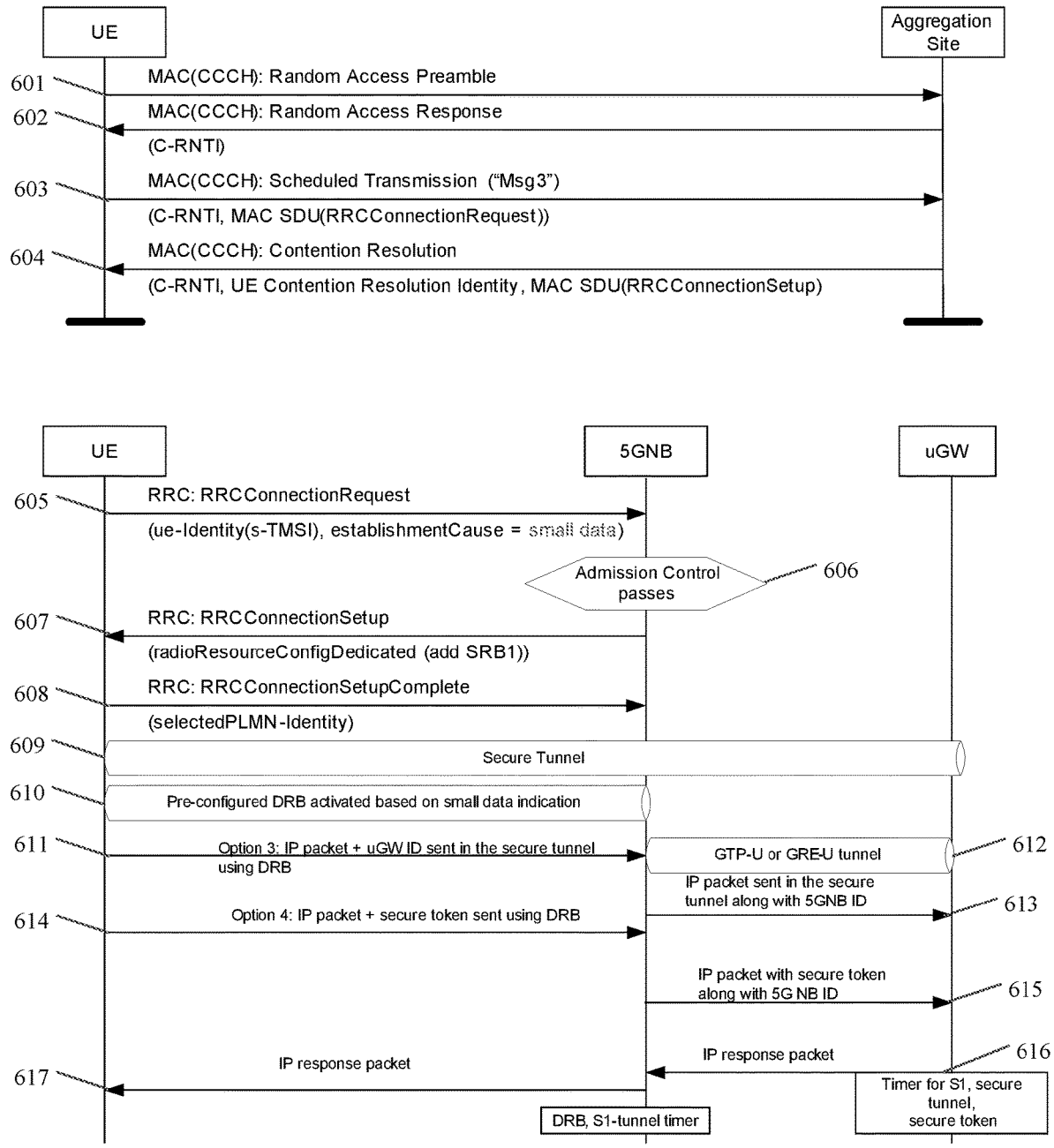
FIG. 6 illustrates a signal flow diagram according to certain embodiments.

FIG. 6 illustrates a signal flow diagram according to certain embodiments. In particular, FIG. 6 illustrates a mobile originated small data transmission. Steps 601 to 604 illustrate a random access procedure undergone by the UE. In step 601, the UE can initiate Radio Resource Control (RRC) establishment by sending a Random Access Preamble in Message 1. Message 1 may include a Random Access Radio Network Temporary Identity (RA-RNTI) that can be used to identity the UE. In step 602, the aggregation side, which can include an access node, such as an eNB or a 5GNB, can respond by sending a Random Access Response to the UE. The response may include a Cell Radio network Temporary Identity (C-RNTI), which can be a temporary ID provided to the UE in order to further communicate with the aggregation site.

In step 603, the UE can use the C-RNTI to send an RRC Connection Request to the aggregation site. This request for scheduled transmission can occur in Message 3 of the random access procedure. The Request may also include a media access control service data unit (MAC SDU). An access node in the aggregation site can respond, in step 604, by sending a contention resolution message to the UE. The contention resolution message can contain a contention resolution identity, which can be used by the UE for further communication with the aggregation site. In step 604, the contention resolution message can also include a MAC SDU for an RRC Connection Setup.

Steps 605 to 616 illustrate the establishment and use of the secure data transmission path. In step 605, the UE can initiate an RRC connection establishment with a cause of transmitting small data. The UE in which the M2M operates, may therefore send an RRC Connection Request to the access node, for example, a 5GNB. The request can include a UE identity, such as a temporary mobile subscriber identity (S-TMSI). In certain embodiments, the request may also include information pertaining to the establishment cause, such as a small data transmission.

In step 606, the access node may conduct admission control for the UE using the received S-TMSI. The determination of whether the connection request by the UE is accepted can be based on admission control policies within the radio network. Admission control policies in the radio network include policies such as number of UEs that can be admitted, number of bearers allocated, and/or amount of resources that can be utilized prior to admitting a certain UE. Once the UE passes the admission control, the access node may send the UE an RRCConnectionSetup message. The content of the setup message can be based on the establishment cause provided by the UE. The access node may determine the configuration for the user plane path for small data transmission, and may activate the path implicitly. Implicit activation may mean that no additional signaling is exchanged between the UE and the access node, beyond the RRC connection request message, to activate the small data transmission path.

As shown in step 607, the RRCConnectionSetup message can include a dedicated radio resource configuration. The dedicated radio resource configuration may be for example an SRB1. The UE may confirm the connection setup by sending the access node an RRCConnection SetupComplete message, in step 608. The setup complete message may include a selected PLMN identity. Upon receiving the response for RRC connection establishment, the UE may activate the secure data transmission path through the user plane implicitly. When the UE implicitly activates a path, no additional signaling and/or no separate RRC reconfiguration message may be needed in order to active that data user plane path.

In certain embodiments, a secure data transmission path may include a secure tunnel 609. The secure tunnel may be established according to the steps described in FIG. 5. In certain other embodiments, a secure data transmission path may include pre-configured data radio bearers 610 that are activated based on a small data indication, sent to the access node in step 605.

According to certain embodiments, as shown in FIG. 3B, the secure data transmission path may include both the secure tunnel 609 and the pre-configured radio bearer 610. In step 611, data in the form of IP packets, for example small data IP packets, may be sent through the secure tunnel 609 using the pre-configured radio bearer 610. The identity of the gateway may also be sent from the UE through the security tunnel towards the gateway using the pre-configured radio bearer 610.

In some embodiments, such as the embodiment shown in FIG. 3B, a tunnel may be established between the access node and the gateway. The tunnel may be a GTP tunnel or a GRE tunnel, as shown in step 612. In step 613, the IP packet received from the UE may be forwarded by the access node to the gateway along with the secure tunnel. The access node may include an access node ID.

In other embodiments, such as the embodiment shown in FIG. 4B, the secure data transmission path may include the pre-configured radio bearer 610. As shown in step 614, the UE may transmit the small data IP packet, including the security token through the pre-configured radio bearer to the access node. In step 615, the access node may transmit the received data or IP packet to the gateway. The access node may include in the transmission to the gateway the security token, the access node ID, and/or the identifier or the IP address of the entity to receive the reply packets. The access node may either send the IP packets as standard IP traffic, or may send the IP packets through the GRE or GTP tunnel.

The gateway can use the received identifier or IP address to transmit the received packet for a certain UE towards the access node. In step 616, the gateway can transmit the IP response packet to the access node. In certain embodiments that utilize a security token, a secure tunnel, and/or a pre-configured radio bearer, there may be a timer that determines a valid period for each. The gateway may be aware of the timers when transmitting information to the access node or to the UE. If a validity timer has expired, and for example, the security token is no longer valid, the gateway may be prevented from sending the IP response packet. Assuming at least some of the timers have not expired, the gateway may transmit the IP packet to the access node in step 616. The access node may then transmit the IP packet to the access node in step 617.

In certain embodiments the gateway may also notify a control plane gateway node, such as a control plane network function, regarding the mobile originated packet from the UE. Informing the control plane network function can help to ensure that the UE reachability information is up to date in the control plane entity that manages paging and control plane transactions. This may improve the reachability of the UE, and can allow the control plane network function to be aware of the location of the UE.

Figure 7:
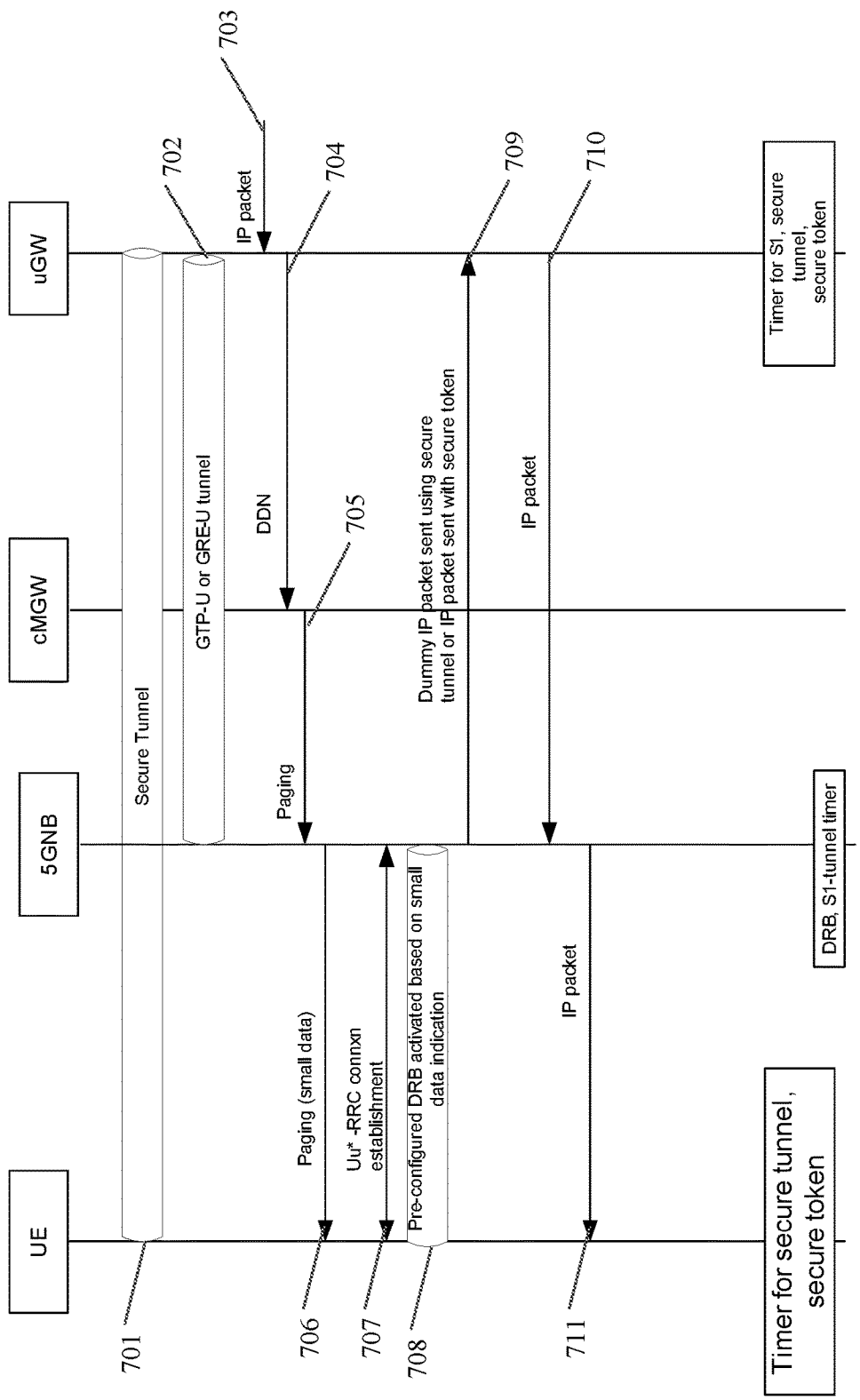
FIG. 7 illustrates a signal flow diagram according to certain embodiments.

FIG. 7 illustrates a signal flow diagram according to certain embodiments. In particular, FIG. 7 illustrates a mobile terminated small data transmission. In the embodiment of FIG. 7, both a secure tunnel 701 and a GTP or GRE tunnel 702 may be established. In step 703, the network can receive data or an IP packet destined for a target UE that is hosting an M2M application. If the UE from which the data originated has a small data uplink path, and the IP packet is classified as small data, the gateway may use the uplink path for small data transmission.

In step 701, the user plane gateway, for example, uGW, will use the uplink path for small data transmission and send a notification message, for example a Downlink Data Notification (DDN), to a control plane gateway node in order to trigger the paging of the target UE. This notification message may include a special cause that indicates that the received IP packet or data can be characterized as small data. In certain embodiments, the paging may be triggered when the UE is in an idle state. In step 705, a control plane gateway node, such as control plane network function, may page the access node, which will then page the UE, as shown in step 706. The paging in steps 705 and 706 may indicate that the cause for the paging is a small data transmission.

In response to the paging, and the indication that a small data transmission is involved, the UE can initiates the establishment of an RRC connection, as shown in step 707. The UE may include a small data cause code in the RRC connection sent to the access node. Based on admission control policies, as described in step 606 of FIG. 6, the access node may accept the RRC connection request, and establish the RRC connection. Because the UE has included an indication that the establishment cause is small data transmission, the access node may determine the configuration needed in the user plane path for a small data transmission. The access node may then implicitly activate a pre-configured radio bearer 708 based on the indication of a small data transmission. The activation may be implicit because no additional signaling is needed between the UE and the access node to activate the radio bearer.

In certain embodiments, once the UE receives a response from the access node indicating the establishment of the RRC connection, the UE can activate parameters necessary for small data user plane path. The activation may also be implicit, without having to receive a separate RRC reconfiguration message from the access node.

In step 709, the UE may transmit a dummy or special acknowledgment IP packet to acknowledge the receipt of paging. The UE may transmit a dummy or a special acknowledgement IP packet to acknowledge the receipt of paging, along with a security token and/or in a secure connection along with 5GNB identifier or IP address. The dummy IP packet may include a security token in certain embodiments. In other embodiments the dummy or special acknowledgment IP packet may be sent in a secure tunnel. The access node identifier and/or an IP address may be included in the IP packet.

The gateway can then use the acknowledgment IP packet as an indication to determine that the UE is connected, and the gateway may respond to the UE an IP packet in step 710. The received IP packet may have been received along with a security token and/or a secure tunnel. The IP packet in step 710 may be sent as a regular IP packet or, in certain embodiments, within the GRE or GTP tunnel that was established between the access node and the gateway. The access node may then transmit the IP packet to the UE, in step 711. In certain embodiments the access node may use the pre-configured radio bearer to transmit the IP packet to the UE. In certain other embodiments, the gateway may take into account any timers for the secure tunnel, security token, and/or the GTP or GRE tunnel.

In some embodiments, the UE may have moved to an area outside the serving area of the uGW, with which secure tunnel 701 has been originally established. If so, a new access node, located in the area to which the UE moved, may select a new uGW. The new uGW may be determined by the destination address in the small data packet sent by the UE to the access node, or may be pre-configured in the access node. In certain embodiments, the uGW can notify the control plane network function regarding the UE response to the paging message. This notification can be used to ensure that the UE reachability information is up to date in the control plane entity that manages paging and control plane transactions.

Figure 8:
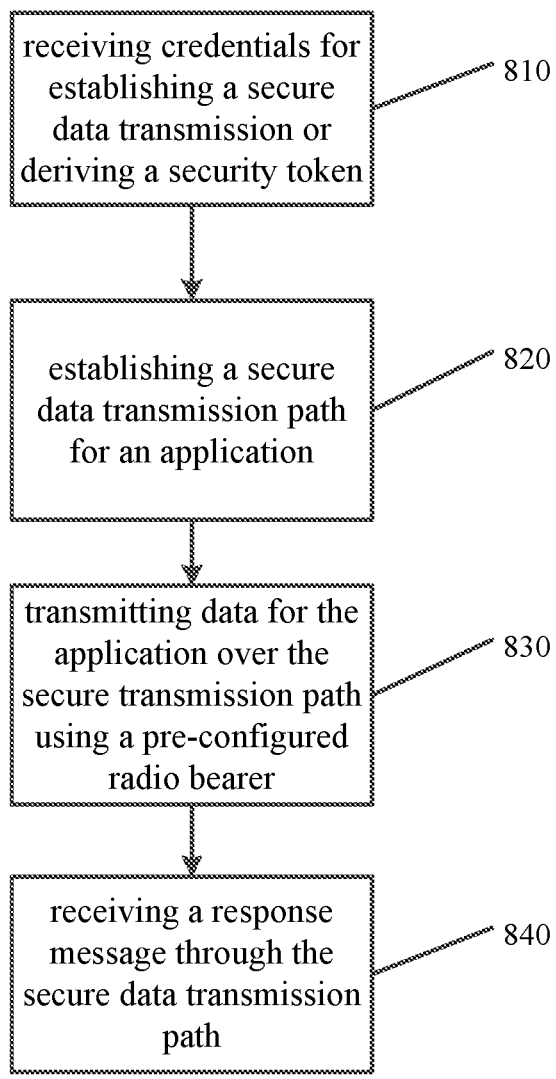
FIG. 8 illustrates a flow diagram according to certain embodiments.

FIG. 8 illustrates a flow diagram according to certain embodiment. In step 810, the UE may derive credentials for establishing the secure data transmission path from a UICC. In certain embodiments, the UE may receive a security token from an entity in the network. In step 820, the UE may then establish a secure data transmission path for an application, for example, such as a M2M application. The secure data transmission path may be used to transmit data between a user equipment and a network element. The network element may include a gateway or an application server. The secure data transmission path may include a secure connection tunnel or a secure tunnel between the UE and the network element. In certain other embodiments a tunnel may also be established between the access node and the network element. The tunnel between the access node and the network element may be a GRE or a GTP tunnel.

In step 830, the UE can transmit data for the M2M application over the secure data transmission path using a pre-configured radio bearer. The radio bearer may be pre-configured for data transmission between the user equipment and the access node. The access node may be located between the UE and the network element, for example, a gateway or an application server. In certain embodiments, the data includes a security token. The security token may be transmitted over the pre-configured radio bearer from the UE to the access node. The security token may be valid for a predetermined period of time. In step 840, the UE receives a response message at the UE from the gateway through the secure data transmission path.

Figure 9:
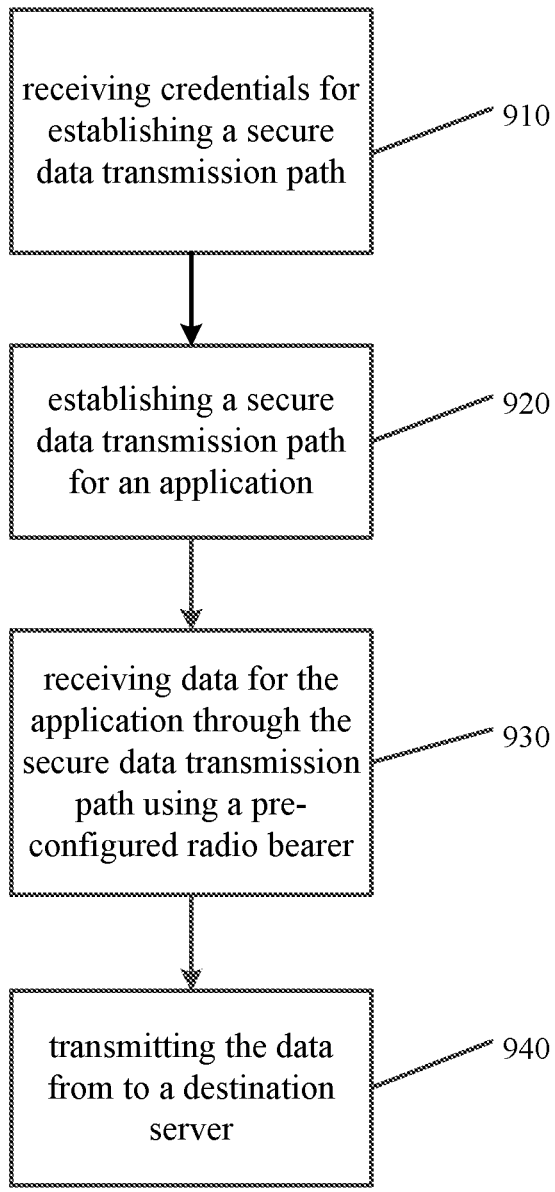
FIG. 9 illustrates a flow diagram according to certain embodiments

FIG. 9 illustrates a flow diagram according to certain embodiment. In step 910, the gateway may receive credentials for establishing a secure data transmission path. The credentials may be sent from a control plane node, or any other network node. In step 920, the gateway may establish a secure data transmission path for an application, such as an M2M application. The secure data transmission path may be used to transmit data, such as small data, between a network element, for example, a gateway or an application server, and a UE.

The gateway may then receive the data for the application through the secure data transmission path using a pre-configured radio bearer, as shown in step 930. The radio bearer may be pre-configured for data transmission between the user equipment and an access node. The access node may be located between the network element, such as a gateway, and the UE. In step 940, the gateway may transmit the data received from the access node through the secure data transmission path to a destination M2M server. The address of the destination M2M server may be included in the data received by the gateway.

Figure 10:
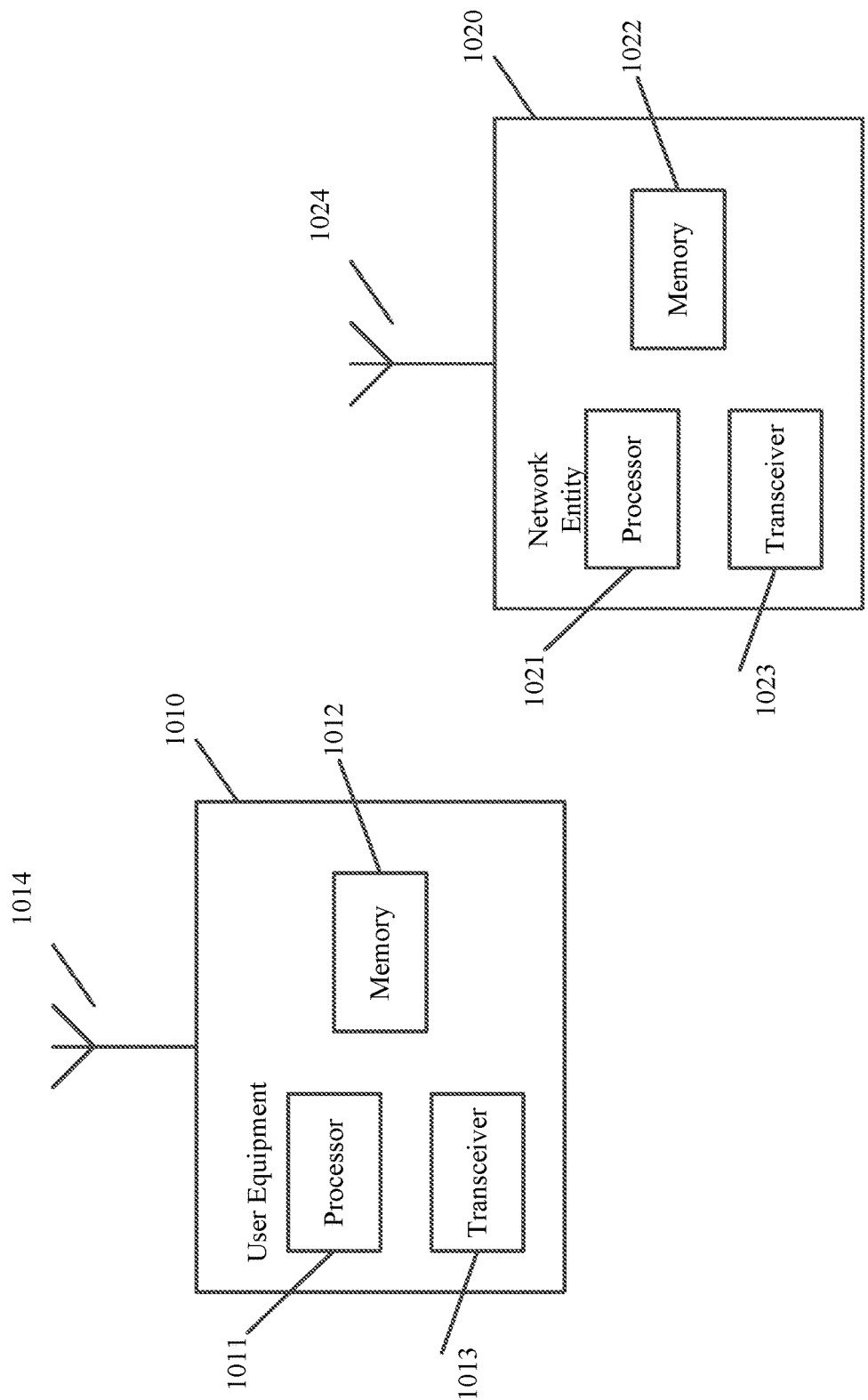
FIG. 10 illustrates a system according to certain embodiments.

FIG. 10 illustrates a system according to certain embodiments. It should be understood that each signal in FIGS. 3A, 3B, 4A, 4B, 5, 6, and 7, and each block in FIGS. 8 and 9 may be implemented by various means or their combinations, such as hardware, software, firmware, one or more processors and/or circuitry. In one embodiment, a system may include several devices, such as, for example, network entity 1020 or UE 1010. The system may include more than one UE 1010 and more one network entity, network element, or network node 1020, although only one access node shown for the purposes of illustration. A network entity, element, or node may be a gateway in the user plane, for example, uGW, or in the control plane, for example, control plane network function. The network entity, element, or node may also be an application server, an access node, a base station, a 5GNB, an LTE eNB, server, host, or any of the other access or network node discussed herein.

Each of these devices may include at least one processor or control unit or module, respectively indicated as 1011 and 1021. At least one memory may be provided in each device, and indicated as 1012 and 1022, respectively. The memory may include computer program instructions or computer code contained therein. One or more transceiver 1013 and 1023 may be provided, and each device may also include an antenna, respectively illustrated as 1014 and 1024. Although only one antenna each is shown, many antennas and multiple antenna elements may be provided to each of the devices. Other configurations of these devices, for example, may be provided. For example, network entity 1020 and UE 1010 may be additionally configured for wired communication, in addition to wireless communication, and in such a case antennas 1014 and 1024 may illustrate any form of communication hardware, without being limited to merely an antenna.

Transceivers 1013 and 1023 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 1010 may be any electronic device capable of M2M communication, and capable of supporting an MTC application. For example, a user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor or a meter.

In some embodiments, an apparatus, such as a network entity, may include means for carrying out embodiments described above in relation to FIGS. 1, 2, 3A, 3B, 4A, 4B, 5, 6, 7, 8, and 9. In certain embodiments, at least one memory including computer program code can be configured to, with the at least one processor, cause the apparatus at least to perform any of the processes described herein.

According to certain embodiments, an apparatus 1020 may include at least one memory 1022 including computer program code, and at least one processor 1021. The at least one memory 1022 and the computer program code are configured, with the at least one processor 1021, to cause the apparatus 1020 at least to establish a secure data transmission path for an application. The secure data transmission path is used to transmit data between a network element and a user equipment. The network element may include a gateway or an application server. The at least one memory 1022 and the computer program code may be configured, with the at least one processor 1021, to also cause the apparatus 1020 at least to receive data for the application through the secure data transmission path using a pre-configured radio bearer. The radio bearer is pre-configured for data transmission between the user equipment and an access node located between the network element and the user equipment. In addition, the at least one memory 1022 and the computer program code may be configured, with the at least one processor 1021, to cause the apparatus 1020 at least to transmit the data from the network element to a destination server.

According to certain embodiments, an apparatus 1010 may include at least one memory 1012 including computer program code, and at least one processor 1011. The at least one memory 1012 and the computer program code are configured, with the at least one processor 1011, to cause the apparatus 1010 at least to establish a secure data transmission path for an application. The secure data transmission path is used to transmit data between a user equipment and a network element. The at least one memory 1012 and the computer program code may be configured, with the at least one processor 1011, to also cause the apparatus 1010 at least to transmit data for the machine-to-machine application over the secure data transmission path using a pre-configured radio bearer. The radio bearer is pre-configured for data transmission between the user equipment and an access node located between the user equipment and the network element. In addition, the at least one memory 1012 and the computer program code may be configured, with the at least one processor 1011, to cause the apparatus 1010 at least to connect to receive a response message at the user equipment from the network element through the secure data transmission path.

Processors 1011 and 1021 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 1012 and 1022 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 1020 or UE 1010, to perform any of the processes described above (see, for example, FIGS. 3A, 3B, 4A, 4B, 5, 6, 7, 8, and 9). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

Furthermore, although FIG. 10 illustrates a system including a network entity 1020 and UE 1010, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 1010 may likewise be provided with a variety of configurations for communication other than communication network entity 1020. For example, the UE 1010 may be configured for device-to-device communication.

Certain embodiments described above may eliminate the NAS aspect of the service request signal to the radio access network and the core network, when the selected data transfer path is a small data path. The network operator may have control over the M2M application that is using the secure data transmission path intended for small data. The radio bearer or radio flow establishment may be optimized by basing the pre-configuration of the radio bearer on information configured at the time the UE registers with the network.

In some embodiments, the upper volume limit of the small data can be constrained by radio design and by the mobility of the UE. The above embodiments may be suitable for frequent and infrequent small data transmission, including burst transmissions.

Further, certain embodiments can reduce the network load brought about by keeping-alive signal flows from smart phones. Certain embodiments also allow for less total network resource consumption for M2M devices, using primarily uplink based infrequent and frequent small data. Secure connectivity established between the UE and the user plane gateway node may ensure that the small data is transmitted securely, and protect both the UE and the network.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. While some embodiments may be directed to a 5G environment, other embodiments can be directed to an LTE environment.

PARTIAL GLOSSARY 5G 5th Generation
M2M Machine to Machine
MTC Machine type communication
SMS Short message service
5GNB 5G Node B
cMGW control plane for Mobile Gateway
uGW user plane Gateway
MO Mobile originated
MT Mobile terminated

We claim:
1. A method, comprising:
  establishing, after registration of an application with a network element, a secure data transmission path for the application based on a trigger from the application or a user equipment, based on a policy, or based on a need of the application, wherein the secure data trans- mission path is used to transmit data between the user equipment and the network element, wherein the network element comprises a gateway or an application server;

transmitting data for the application over the secure data transmission path using a pre-configured radio bearer, wherein the radio bearer is pre-configured for data transmission between the user equipment and an access node located between the user equipment and the network element; and receiving a response message at the user equipment from the network element through the secure data transmission path, wherein the secure data transmission path comprises a secure tunnel between the user equipment and the network element, and wherein the security tunnel provides at least confidentiality or integrity protection on internet protocol (IP) level.

2. The method according to claim 1, wherein the application is a machine-to-machine application.

3. The method according to claim 1, wherein the secure data transmission path comprises a tunnel established between the access node and the network element.

4. The method according to claim 3, wherein the tunnel is a generic routing encapsulation tunnel or a general packet radio service tunneling protocol tunnel.

5. A method, comprising:
establishing, after registration of an application with a network element, a secure data transmission path for the application based on a trigger from the application or a user equipment, based on a policy, or based on a need of the application, wherein the secure data transmission path is used to transmit data between the user equipment and the network element, wherein the network element comprises a gateway or an application server;

deriving credentials for establishing the secure data transmission path from a universal integrated circuit card in the user equipment;

transmitting data for the application over the secure data transmission path using a pre-configured radio bearer, wherein the radio bearer is pre-configured for data transmission between the user equipment and an access node located between the user equipment and the network element; and receiving a response message at the user equipment from the network element through the secure data transmission path.

6. The method according to claim 1, wherein the secure data transmission path is valid for a predetermined period of time.

7. The method according to claim 1, wherein the user equipment transmits the data over the pre-configured radio bearer when the user equipment initially registers with a network.

8. The method according to claim 1, further comprising:
receiving an identification of the network element from a network entity.

9. The method according to claim 1, wherein the data includes a security token.

10. The method according to claim 9, wherein the security token is transmitted over the pre-configured radio bearer from the user equipment to the access node.

11. The method according to claim 9, further comprising:
receiving the security token at the user equipment from a network entity.

12. The method according to claim 9, wherein the security token is valid for a predetermined period of time.

13. A method, comprising:
establishing, after registration of an application with a network element, a secure data transmission path for the application based on a trigger from the application or a user equipment, based on a policy, or based on a need of the application, wherein the secure data transmission path is used to transmit data between the network element and the user equipment, wherein the network element comprises a gateway or an application server;

receiving data for the application through the secure data transmission path using a pre-configured radio bearer, wherein the radio bearer is pre-configured for data transmission between the user equipment and an access node located between the network element and the user equipment; and transmitting the data from the network element to a destination server, wherein the secure data transmission path comprises a secure tunnel between the user equipment and the network element, and wherein the security tunnel provides at least confidentiality or integrity protection on internet protocol (IP) level.

14. The method according to claim 13, wherein the application is a machine-to-machine application.

15. The method according to claim 13, wherein the secure data transmission path comprises a tunnel established between the network element and the access node.

16. The method according to claim 15, wherein the tunnel is a generic routing encapsulation tunnel or a general packet radio service tunneling protocol tunnel.

17. The method according to claim 13, wherein an address of the application server is included in the data.

18. A method, comprising:
establishing, after registration of an application with a network element, a secure data transmission path for the application based on a trigger from the application or a user equipment, based on a policy, or based on a need of the application, wherein the secure data transmission path is used to transmit data between the network element and the user equipment, wherein the network element comprises a gateway or an application server;

receiving data for the application through the secure data transmission path using a pre-configured radio bearer, wherein the radio bearer is pre-configured for data transmission between the user equipment and an access node located between the network element and the user equipment; and transmitting the data from the network element to a destination server receiving credentials for establishing a secure data transmission path from a control plane node, wherein the credentials for establishing the secure data transmission path are derived from a universal integrated circuit card in the user equipment.

19. The method according to claim 13, wherein the data includes a security token.

20. The method according to claim 19, comprising:
wherein the security token is used in the establishing a tunnel between the access node and the network element.

21. An apparatus, comprising:
at least one processor; and at least one memory including computer program code,
wherein the at least one memory and the computer program code are configured to, with the at least one processor, cause the apparatus at least to perform a process comprising:
establishing, after registration of an application with a network element, a secure data transmission path for the application based on a trigger from the application or a user equipment, based on a policy, or based on a need of the application, wherein the secure data transmission path is used to transmit data between the user equipment and the network element, wherein the network element comprises a gateway or an application server;
transmitting data for the application over the secure data transmission path using a pre-configured radio bearer, wherein the radio bearer is pre-configured for data transmission between the user equipment and an access node located between the user equipment and the network element; and
receiving a response message at the user equipment from the network element through the secure data transmission path,
wherein the secure data transmission path comprises a secure tunnel between the user equipment and the network element, and
wherein the security tunnel provides at least confidentiality or integrity protection on internet protocol (IP) level.

22. A computer program product embodied on a non-transitory computer-readable medium, said medium encoding instructions that, when executed in hardware, perform a process, the process comprising:
establishing, after registration of an application with a network element, a secure data transmission path for the application based on a trigger from the application or a user equipment, based on a policy, or based on a need of the application, wherein the secure data transmission path is used to transmit data between the user equipment and the network element, wherein the network element comprises a gateway or an application server;
transmitting data for the application over the secure data transmission path using a pre-configured radio bearer, wherein the radio bearer is pre-configured for data transmission between the user equipment and an access node located between the user equipment and the network element; and
receiving a response message at the user equipment from the network element through the secure data transmission path,
wherein the secure data transmission path comprises a secure tunnel between the user equipment and the network element, and
wherein the security tunnel provides at least confidentiality or integrity protection on internet protocol (IP) level.

* * * * *